United States Patent [19]

Slangen

[11] Patent Number: 5,587,178
[45] Date of Patent: Dec. 24, 1996

[54] PROCESS FOR THE TREATMENT OF ASPARTAME

[75] Inventor: Hubertus J. M. Slangen, Stein, Netherlands

[73] Assignee: Holland Sweetner Company V.o.F., Maastricht, Netherlands

[21] Appl. No.: 351,579

[22] Filed: Dec. 7, 1994

Related U.S. Application Data

[63] Continuation-in-part of Ser. No. 74,446, Jun. 10, 1993, Pat. No. 5,411,747.

[30] Foreign Application Priority Data

Jun. 11, 1992 [NL] Netherlands ............................ 9201029

[51] Int. Cl.$^6$ ...................................... A61K 9/20
[52] U.S. Cl. ........................... 424/464; 424/489; 514/951
[58] Field of Search ..................................... 424/464, 489, 424/465; 514/951

[56] References Cited

U.S. PATENT DOCUMENTS

| | | | |
|---|---|---|---|
| 4,594,252 | 6/1986 | Niemczyk | 426/307 |
| 4,816,268 | 3/1989 | Tsau | 426/85 |

*Primary Examiner*—James M. Spear
*Attorney, Agent, or Firm*—Cushman Darby & Cushman IP Group of Pillsbury Madison & Sutro, LLP

[57] ABSTRACT

The invention relates to a process for the treatment of dried aspartame characterized in that, in a first separation step, particles smaller than 50 μm are removed, with the aid of a stream of air, from aspartame having a particle size distribution with which more than 5 wt. % of the aspartame has a particle size of less than 20 μm and more than 10 wt. % of the aspartame has a particle size of more than 400 μm, and that in a second separation step the product resulting from the first step is subjected to a screening step using a screen that separates at a value between 150 and 250 μm, after which the fraction of the smaller particles thus obtained is recovered as a first product and the fraction of the larger particles is recovered as a second product or is optionally subjected to a further separation step using a screen that separates at a value between 400 and 1000 μm, the fraction of smaller particles thus obtained being recovered as the second product. Aspartame having a particle size distribution in which at least 94% of the particles are larger than 20 μm and smaller than 250 μm appears to present exceptionally good properties as regards processability and dissolution rate.

15 Claims, No Drawings

PROCESS FOR THE TREATMENT OF ASPARTAME

This patent application is a Continuation-In-Part of U.S. patent application Ser. No. 08/074,446, filed Jun. 10, 1993, now U.S. Pat. No. 5,411,747 the entire contents of which are hereby incorporated by reference and relied upon.

BACKGROUND OF THE INVENTION

1. Field of the Invention

This invention relates to a process for the treatment of dried aspartame, and to aspartame thus recovered.

2. Description of the Related Art

Aspartame is a sweetener that is often used in low-calorie lemonades, sugar-free chewing gum and low-calorie sweeteners. Aspartame is often sold as a "powder" consisting of particles smaller than 1 mm. This powder usually has a wide particle size distribution: there is a significant fraction of particles with sizes between 0 and 20 μm, 20–50 μm, etc. This type of product appears to be (1) relatively poorly soluble, (2) electrostatically chargeable, (3) non-free-flowing, (4) the cause of dust problems, (5) difficult to dose and (6) poorly dispersible in water.

In order to prevent some of these problems, aspartame is sometimes sold of which 90 wt. % of the particles are between, say, 250 and 750 μm. This aspartame, however, has a relatively low dissolution rate. In addition, it presents the drawback that a special treatment, for example a granulation step, is required afterwards to process undesired material (aspartame with particle sizes outside this range).

The present invention provides a process for the treatment of dried aspartame with which a product of a very high quality and good dissolution rate is obtained and with which only very little material need be reprocessed.

SUMMARY OF THE INVENTION

The present invention discloses aspartame in particulate form having a particle size distribution within a range of 20 μm to 250 μm, wherein at least 94 wt. % of the aspartame particles are within said range.

The present invention also discloses such aspartame, wherein at least 90 wt. % of the particles are larger than 30 μm and such aspartame, wherein at least 90 wt % of the particles are larger than 50 μm.

The present invention further discloses such aspartame, wherein at least 97 wt. % of the particles are larger than 30 μm and such aspartame, wherein at least 97 wt. % of the particles are larger than 40 μm.

The present invention also discloses such aspartame, wherein at least 97 wt. % of the particles are less than 220 μm and such aspartame, wherein at least 97 wt. % of the particles are less than 205 μm.

The present invention also discloses a tablet obtained by tableting aspartame particles, wherein at least 94 wt. % of the particles are in a particle size distribution range of 20 μm to 250 μm.

The present invention further discloses such a tablet, wherein at least 90 wt. % of the aspartame particles are larger than 30 μm and such a tablet, wherein at least 90 wt. % of the aspartame particles are larger than 50 μm.

The present invention further discloses such a tablet, wherein at least 97 wt. % of the aspartame particles are larger than 30 μm and such a tablet, wherein at least 97 wt. % of the aspartame particles are larger than 40 μm.

The present invention further discloses such a tablet, wherein at least 97 wt. % of the aspartame particles are less than 220 μm and such a tablet, wherein at least 97 wt. % of the aspartame particles are less than 205 μm.

The present invention also discloses a tablet obtained by preparing dried aspartame, wherein in a first separation step, particles smaller than 50 μm are removed, with the aid of a stream of air, from aspartame having a particle size distribution with which more than 5 wt. % of the aspartame has a particle size of less than 20 μm and more than 10 wt. % of the aspartame has a particle size of more than 400 μm and that in a second separation step, the product resulting from the first step is subjected to a screening step using a screen that separates at a value between 150 and 250 μm, after which the fraction of the smaller particles thus obtained is recovered as a first product dried aspartame and the fraction of the larger particles is recovered as a second product dried aspartame or is optionally subjected to a further separation step using a screen that separates at a value between 400 and 1000 μm, the fraction of smaller particles thus obtained being recovered as a second product dried aspartame and preparing a tablet comprising the first product dried aspartame.

DETAILED DESCRIPTION OF THE PREFERRED EMBODIMENTS

The process for the treatment of dried aspartame is characterized in that, in a first separation step, particles smaller than 50 μm are removed for the most part, with the aid of a stream of air, from aspartame having a particle size distribution with which more than 5 wt. % of the aspartame has a particle size of less than 20 μm and more than 10 wt. % of the aspartame has a particle size of more than 400 μm and, in a second separation step, the product resulting from the first step is subjected to a screening step using a screen that separates at a value between 150 and 250 μm, after which the fraction of the smaller particles thus obtained is recovered as a first product dried aspartame and the fraction of the larger particles is recovered as a second product dried aspartame or is optionally subjected to a further separation step using a screen that separates at a value between 400 and 1000 μm, the fraction of smaller particles thus obtained being recovered as a second product dried aspartame.

In the first step, particles smaller than 40 μm, in particular smaller than 30 μm, more in particular particles smaller than 20 μm, are preferably separated (hereinafter to be referred to as very fine aspartame), the fractions of particles larger than 40 μm, larger than 30 μm and larger than 20 μm, respectively, being the product resulting from the first step.

The very fine aspartame is preferably returned to the process. This aspartame may, for example, be dissolved and recrystallized. It is also possible, and preferable, to mix this aspartame with aspartame slurry from a crystallizer or centrifuge for a granulation and drying step.

A classifier and a stream of air are used to separate this very fine aspartame. As a rule, more than 1 kg of air per kg of aspartame is used as the stream of air. Preferably, use is made of between 2 and 50 kg of air, in particular of between 5 and 20 kg per kg of aspartame. Very suitable is, for example, a "Sweco Turbo-Screen" (hereinafter also to be referred to as TS) manufactured by Sweco. It is not possible to effect good separation in practice using an ordinary screen, without an additional driving force of a stream of air.

In addition, the classifier medium (usually a very fine screen or a plate with very small holes) is preferably continuously cleaned. This can be done, for example, by vibrating the screen or plate or by countercurrently blowing air through the screen or plate in places.

In order to separate very fine aspartame, the use of a fluidized bed is also very suitable. As a rule, the rate of fluidization will be chosen between 5 and 25 cm/sec. The thickness of the layer in the fluid bed may vary within a wide range without affecting the separation essentially.

For the process according to the invention, it appears to be very important to separate very fine aspartame in a first separation step. This ensures that the next separation step, using a screen that separates at 150–250 µm, takes place without problems in a very efficient manner. When a screening step at for example 200 µm was carried out as the first separation step, the screening apparatus became fouled/blocked and it proved difficult to dose the aspartame.

The product resulting from the first separation step is subjected to a second separation step using a screen that separates at a value between 150 and 250 µm. Preferably, the screen separates at a value between 170 and 220 µm, in particular at a value between 180 and 205 µm.

The fraction of the larger particles resulting from the second separation step is either directly recovered as a second product or it is subjected to a further separation step to remove relatively coarse material. Use can be made of a screen that separates at a value between 400 and 1000 µm, depending on the desired application of the aspartame product. If only the coarsest material is to be removed, a screen that separates at a value between 900 and 1000 µm is very suitable. Such a screening step may optionally also take place before the second separation step, but that is not preferable because then all of the aspartame (with the exception of the very fine aspartame) is subjected to this screening step, which means that a relatively large screen is required, which is less attractive from an economic point of view.

The separated coarse material can be ground and returned to the beginning of the treatment section for the use of the process according to the invention.

In this manner several fractions of aspartame are obtained, the fraction recovered as the first product in particular having very good properties. In particular the combination of a high dissolution rate, good flow properties (free flowing), good dispersibility, little dust formation and the virtual absence of electrostatic charging is unique. In addition, this aspartame appears to be extremely suitable for use in tablets, powders and chewing gum in particular, because the absence of larger particles means that a good distribution of aspartame throughout the product is obtained.

In commercial scale tableting of aspartame, using standard equipment (direct compression type equipment in general is considered to be the most preferred equipment for tableting) and "state of the art" aspartame products as of the priority date of U.S. patent application Ser. No. 08/074,446, U.S. Pat. No. 5,411,747 many problems occurred, whatever type of excipient and/or tableting agent was added in the process. The main problems were that the tablets tended to "adhere"/"stick" to the punches or dies of the tableting machine (which according to our present understanding may be attributed to the presence of microcrystalline product in the aspartame) and that the tableting equipment could not be run/operated smoothly.

The permanent presence of one or more operators, who needed to take many corrective actions during the processing of tablets, was required to run/operate the tableting equipment properly. The equipment often had to be stopped or operating conditions had to be adjusted (e.g., by lowering the rotation speed of the equipment), and feed to the tableting machine had to be kept in motion by tapping/knocking from the outside. It usually turned out to be impossible to continue production of tablets until all of the starting material had been processed; final parts thereof usually could not be pressed into the tableting machine.

This conventional tableting process resulted in relatively low production capacity of tablets, and in a high rejection percentage of tablets produced (poor quality). Moreover, the tablets made showed a broad range of distribution of weight and strength, and were not very uniform. In addition, production of tablets caused much noise, because the machinery could not operate smoothly and tapping/knocking was necessary. And last, but not least, the outer appearance of the tablets produced was relatively poor, especially in such cases where one wanted to "imprint" lines, signs, circles or figures, etc., at the surface of the tablets. In those cases, the problems of "adhering/sticking" to the punches and dies were even larger.

The above-described problems in the tableting process have now been overcome by using the aspartame made according to the process disclosed herein. This has been demonstrated in production scale experiments using tableting equipment which previously had been used (experiencing the problems mentioned above) for various years with "state of the art" aspartame products. In these experiments performed on a Kilian high speed rotating tableting machine, having 51×6 punches, and a maximum capacity of $1.8 \times 10^6$ tablets per hour at a maximum rotation speed of 49 rpm, aspartame was tableted together with "tablettose" (commercially-sold free flowing lactose product, for tableting purposes, from Meggler) as is used in the conventional production runs.

Though it is known in principle that relatively large particles of aspartame can be tableted, tablets made from such course products usually tend to be undesirable, i.e., commercially unattractive, due to the poor dissolution rate characteristics of the products obtained. Dissolution rate properties as such would be better if relatively fine aspartame particles would be used, however, such product is very poor in flowing properties, and therefore not very suitable for tableting. It now, surprisingly, has been found that the aspartame product of the present invention is most suitable for tableting purposes, and results in tablets having good dissolution properties. Most surprisingly, it also has been found that the outer appearance of the tablets obtained is much improved as compared with the known tablets, and, especially that lines, signs, circles or figures, etc., could be imprinted at the surface of the tablets during the tableting process in a very exact way.

It clearly has been demonstrated that direct compression tableting of aspartame, obtained according to the method of the present application, is very favorable. The tablets obtained are very homogeneous and uniform, both in weight and strength; the tableting machinery can be operated without attendance for many hours, and without problems of undesired noise levels, etc.; no tapping/knocking is necessary, and no adhering/sticking of product to the punches and dies occurs; the rejection percentage of tablets made in this way is extremely low; and finally, production can be continued undisturbed until all of the starting material has been converted into tablets.

The aspartame used in the production of these tablets is prepared from the above-described first product dried aspartame and is characterized by a narrow particle size distribution in which 97 wt. % of the particles are larger than 20 µm, preferably larger than 30 µm, in particular larger than 40 µm. In addition, 97 wt. % of the particles are smaller than 250 µm, preferably smaller than 220 µm, in particular smaller than 205 µm. In addition, 90 wt. % of the particles are preferably larger than 30 µm, in particular larger than 50 µm. The different values preferred for the upper and lower limits can be combined with one another in different manners for products that meet specific economic or technical requirements.

The second product dried aspartame is a granular type of aspartame that has a good bulk density and is easily processable but dissolves less quickly than the first product.

As starting material for the process according to the invention, use is preferably made of dry aspartame with a moisture content of less than 6 wt. % in particular with a moisture content of 1–4 wt. %. The aspartame is usually recovered through crystallization from an aqueous solution. The slurry finally obtained is filtered off with the aid of for example a centrifuge and the wet cake (containing about 25–60 wt. % water) is dried and optionally granulated. In the granulation step or steps, aspartame may already be formed that has a particle size distribution that makes it suitable for use in the process according to the invention. If, however, a relatively large amount of coarse material is present, for example, if more than 20 wt. % has a particle size of more than 1 mm, then it is preferable to grind the material first.

The starting material usually has a wide particle size distribution, which is the result of the mechanical forces exerted during the granulation, reduction and drying steps. As a rule, the aspartame has such a distribution that more than 5 wt. % of the aspartame has a particle size of less than 20 µm and that more than 10 wt. % has a particle size of more than 400 µm.

Although it is common to speak of separation at a particular value in the case of, for example, screening, it is of course true that around that value a portion of the material having a smaller particle size will not pass through the screen and a portion of the larger material will, depending on the efficiency of the screen. This is because the holes of a screen are not all as large as one another and the particles are not ideally round.

The invention will be elucidated with reference to the following non-limiting examples.

EXAMPLE 1

Aspartame obtained through centrifugation, granulation, drying and grinding had the following characteristics:
$d_{10}$:40 µm
$d_{50}$:180 µm
$d_{90}$:820 µm
moisture:2.8 wt. %

This aspartame was subjected to the following steps:

1) treatment in a Sweco TS 18, using a plate that separates at 50 µm and a stream of air of 10 kg of air per kg of aspartame. The fine material was returned to the granulation section where it was dispersed in the centrifuged aspartame slurry;

2) the resulting product was passed through a 200-µm screen. The fraction of the smaller particles was recovered as product 1;

3) the material consisting of the larger particles was passed through a 900-µm screen. The coarse material was returned to the grinding step; the desired fraction was recovered as product 2.

14% very fine and 5% coarse aspartame were separated. 40% product 1 and 40% product 2 were recovered and there was 1% loss.

The properties of the products are shown in Table 1.

TABLE 1

|  | Product 1 | Product 2 |
| --- | --- | --- |
| $d_3$ | 32 µm | 180 µm |
| $d_{10}$ | 55 µm | 230 µm |
| $d_{50}$ | 95 µm | 400 µm |
| $d_{90}$ | 180 µm | 700 µm |
| $d_{97}$ | 200 µm | 900 µm |

Further properties of product 1 were:
settling angle: 24°
bulk density: 410 kg/m³
outflow time*: 9 sec
dissolution rate**: 4 min
*the amount of time that it took for 20 cm³ of product to flow out of a funnel with an outflow aperture with a diameter of 9 mm was measured;
**0.4 g of aspartame in 1 liter of water at 20° C., using a magnetic stirrer and a stirring rod whose diameter was half that of the vessel; 200 rpm in a 2-liter beaker.

COMPARATIVE EXAMPLE 1

Aspartame as described in Example 1 was passed through a 200-µm screen. The screen became blocked several times. The cleaning of the screen caused a 5% loss of product. The screened product presented the following properties:

TABLE 2

|  | comparative product |
| --- | --- |
| $d_{10}$ | 20 |
| $d_{50}$ | 70 |
| $d_{90}$ | 160 |
| $d_{99}$ | 200 | settling angle: 34°
bulk density: 385 kg/m³
outflow time: ∞
dissolution rate: 8 min

EXAMPLE 2 AND COMPARATIVE EXAMPLES 2 AND 3

The advantages of use of aspartame according to the present invention for the preparation of tablets can be seen by comparing the results of the following example using Holland Sweetener test product according to the present invention (product A), and comparative examples using NutraSweet® powder product (product B) or Holland Sweetener Company powder product (product C). Example 2 and Comparative Examples 2 and 3 were performed under comparable conditions (Kilian; high speed rotating tableting machine; 51×6 punches; maximum capacity of 1.8×10⁶ tablets per hour at 49 rpm maximum). The composition of the starting mixture was in each case 35 wt % of aspartame and 65 wt. % of tablettose (Meggler), with minor amounts of other standard ingredients for assisting the tableting process, identical in all cases.

Only in the case of use of product A (aspartame particles obtained according to the method of the present invention) was it possible to run the equipment smoothly at maximum capacity for many hours. In the comparative examples, adjustment of rotation speed to about 40 rpm was necessary, and the operation required much attention. The outer appearance of tablets made from product A was much better than of those made from products B and C.

Relevant data for starting materials and tablets produced are shown in Table 3. The data for the aspartame (APM) starting material (in the tableting step) also show various values which are important in estimating the flow properties of said product. These data have been determined according to standard methods known to those skilled in the art. The combined criteria for flow properties are usually presented in the form of the "Carr index", a classification system first presented by Ralph L. Carr, Jr., in "Chemical Engineering", 1965 pages 163–168, and incorporated herewith by reference. This reference also shows how the various data can be determined. A total "Carr point score" above 70 indicates that the product will flow fairly well without aid (though occasionally some vibration might be needed); a "Carr point score" in the range of 40 to 59 means that flowability is poor and that agitation/vibration is necessary for keeping the product in motion when flowing; a "Carr point score" of 20 to 39 indicates that flowability and performance are very poor, and more positive agitation is required in moving the product.

From the results shown in the Table 3, it is clear that tablets comprising aspartame according to the present invention can be produced at a higher production rate and more smoothly, with less spread of results in average tablet weight, aspartame content and strength of tablets, as compared to tablets prepared from conventional aspartame particles.

TABLE 3

TABLETING OF ASPARTAME WITH TABLETTOSE

| Item | | Present Invention Product A | Comparative Examples | |
|---|---|---|---|---|
| | | | Product B | Product C |
| | DATA STARTING MATERIAL APM | | | |
| 1. | particle size | | | |
| | % < 20 µm | n.d. | n.d. | 11.69% |
| | % < 50 µm | 1.81% | 99% | n.d. |
| | % < 75 µm | n.d. | n.d. | 54.45% |
| | % > 200 µm | 0.57% | 0% | 4.69% |
| | $d_{50}$ | 130 µm | | 70 µm |
| | $d_{90}$ | 186 µm | 21 µm | 175 µm |
| | $d_{95}$ | 194 µm | 37 µm | 199 µm |
| 2. | angle of repose | 31.6° | 50.8° | 48.3° |
| | CARR POINTS | 21.8 | 12.1 | 13.3 |
| 3. | Free bulk density | 445 kg/m³ | 215 kg/m³ | 267 kg/m³ |
| | Tapped bulk density | 538 kg/m³ | 355 kg/m³ | 374 kg/m³ |
| | Compressibility | 16.4% | 39.6% | 28.6% |
| | CARR POINTS | 19.3 | 3.3 | 12.1 |
| 4. | Angle of rupture | 35.1° | 56.8° | 46.0° |
| | CARR POINTS | 21.6 | 14.3 | 18.0 |
| 5. | Cohesion | 19.1% | 36.6% | 10.4% |
| | CARR POINTS | 11.8 | 8.4 | 13.4 |
| 6. | Total points Carr | 74.5 | 38.1 | 56.8 |
| | DATA ON PRODUCTION OF TABLETS COMPRISING APM | | | |
| 7. | max. possible speed of rotation for smooth production | 49 rpm (= limit of equipment) | <40 rpm | <40 rpm |
| 8. | outer appearance | ++ | +/– | +/– |
| 9. | attention needed during production | no | yes | yes |

TABLE 3-continued

TABLETING OF ASPARTAME WITH TABLETTOSE

| Item | | Present Invention Product A | Comparative Examples | |
|---|---|---|---|---|
| | | | Product B | Product C |
| 10. | average tablet weight | 50 mg | 47 mg | 48 mg |
| | standard deviation | 1.9% | 4.3% | 3.0% |
| 11. | average APM content | 17.64 mg | 16.3 mg | n.d. |
| | standard deviation | 2.2% | 3.8% | n.d. |
| 12. | average strength of tablet | 20.5 N | 21.9 N | 10.5 N |
| | standard deviation | 11% | 21% | 26% |

While the present invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

Thus, it is to be understood that variations in the present invention can be made without departing from the novel aspects of this invention as defined in the claims.

What is claimed is:

1. A tablet comprising aspartame, obtained by direct compression tableting aspartame particles, wherein at least 94 wt. % of said aspartame particles are in a particle size distribution range of 20 µm to 250 µm.

2. The tablet of claim 1, wherein at least 90 wt. % of said aspartame particles are larger than 30 µm.

3. The tablet of claim 1, wherein at least 90 wt. % of said aspartame particles are larger than 50 µm.

4. The tablet of claim 1, wherein at least 97 wt. % of said aspartame particles are larger than 30 µm.

5. The tablet of claim 1, wherein at least 97 wt. % of said aspartame particles are larger than 40 µm.

6. The tablet of claim 1, wherein at least 97 wt. % of said aspartame particles are less than 220 µm.

7. The tablet of claim 1, wherein at least 97 wt. % of said aspartame particles are less than 205 µm.

8. The tablet of claim 1, further comprising excipients or tableting agents.

9. The tablet of claim 1, further comprising excipients and tableting agents.

10. A tablet obtained by a) preparing dried aspartame, wherein
   in a first separation step, particles smaller than 20 µm are removed, with the aid of a stream of air, from aspartame having a particle size distribution with which more than 5 wt. % of the aspartame has a particle size of less than 20 µm and more than 10 wt. % of the aspartame has a particle size of more than 400 µm and that,
   in a second separation step, the product resulting from the first step is subjected to a screening step using a screen that separates at a value between 150 and 250 µm, after which the fraction of the smaller particles thus obtained is recovered as a first product dried aspartame and the fraction of the larger particles is recovered as a second product dried aspartame or is optionally subjected to a further separation step using a screen that separates at a value between 400 and 1000 μm, the fraction of smaller particles thus obtained being recovered as a second product dried aspartame and b) preparing a tablet comprising said first product dried aspartame.

11. The tablet of claim 10, further comprising excipients or tableting agents.

12. The tablet of claim 10, further comprising excipients and tableting agents.

13. A tablet obtained according to claim 10, wherein in said first separation step, particles smaller than 30 μm are removed.

14. A tablet obtained according to claim 10, wherein in said first separation step, particles smaller than 40 μm are removed.

15. A tablet obtained according to claim 10, wherein in said first separation step, particles smaller than 50 μm are removed.

* * * * *